US008993097B2

(12) United States Patent
Kwon et al.

(10) Patent No.: US 8,993,097 B2
(45) Date of Patent: Mar. 31, 2015

(54) TAPERED HEIGHT CURVED COMPOSITE STRINGERS AND CORRESPONDING PANELS

(75) Inventors: Hyukbong Kwon, Mukilteo, WA (US); Paul E. Nelson, University Place, WA (US); Ben Christopher Welte, Everette, WA (US); Karl B. Lee, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 771 days.

(21) Appl. No.: 13/269,839

(22) Filed: Oct. 10, 2011

(65) Prior Publication Data

US 2013/0089712 A1    Apr. 11, 2013

(51) Int. Cl.
*B32B 1/00* (2006.01)
*B32B 3/00* (2006.01)
*B64C 1/06* (2006.01)
*B64C 1/12* (2006.01)

(52) U.S. Cl.
CPC .. *B64C 1/064* (2013.01); *B64C 1/12* (2013.01)
USPC ............................ 428/174; 438/119; 438/120

(58) Field of Classification Search
CPC ............. B32B 3/28; B32B 3/00; B32B 5/02; B32B 21/02; B32B 17/10293; B32B 2260/021; B32B 2260/04; B32B 2260/046; B32B 2262/105; B32B 2262/106; B32B 2262/10; B64B 1/14; B29C 66/721; B64C 3/18; B64C 3/182; B64C 1/068; B64C 1/069; B64C 1/12; B64C 3/26; B64C 2001/0072; B64C 1/00

USPC ............... 428/119, 120, 156, 192, 408, 174; 244/119, 120, 126, 131, 132
See application file for complete search history.

(56) References Cited

U.S. PATENT DOCUMENTS 4,972,696 A    11/1990 Apps
7,866,535 B2    1/2011 Eilert et al.
(Continued)

FOREIGN PATENT DOCUMENTS

DE    102008057247 B3    1/2010
DE    102009056994 A1    6/2011
(Continued)

OTHER PUBLICATIONS

Translation of DE102008057247 B3, published on Jan. 28, 2010.*
International Search Report & Written Opinion dated Dec. 5, 2012 in PCT Application No. PCT/US12/52894.

*Primary Examiner* — Catherine A Simone
(74) *Attorney, Agent, or Firm* — Hope Baldauff, LLC

(57) ABSTRACT

Apparatus and methods provide for utilizing continuous curved composite stringers to control the loads and corresponding moments within curved regions of an aircraft or other vehicle without delamination or other interlamina failures. According to embodiments described herein, any number of tapered height curved composite stringers may be coupled to continuous skin components to create a curved continuous panel. The tapered height curved composite stringers may have webs that taper to a reduced height within curved regions and corresponding base flanges that widen during web tapering. Reinforcement fittings may be coupled to the base flanges in the curved regions for further strengthening and to provide for the attachment of supplemental panels to the stringers.

19 Claims, 5 Drawing Sheets

(56) References Cited

U.S. PATENT DOCUMENTS

2009/0176066 A1 7/2009 Darrow et al.
2010/0178453 A1 7/2010 Wood

FOREIGN PATENT DOCUMENTS

| EP | 1918089 A2 | 5/2008 |
|---|---|---|
| WO | 2006001859 A1 | 1/2006 |

* cited by examiner

STATION A

STATION D

STATION B

STATION E

STATION C

STATION F

STATION G

TAPERED HEIGHT CURVED COMPOSITE STRINGERS AND CORRESPONDING PANELS

BACKGROUND

Aircraft, ships, and other vehicles are more commonly being constructed using composite materials, such as carbon fiber reinforced polymer (CFRP) components, to take advantage of the light weight and high strength that these types of composite materials provide over conventional materials. As an example, bonded stringers that are used to provide structural support to aircraft skin may be manufactured from CFRP to create components that are strong, but lightweight when compared to traditionally fasten metal stringers to skin. However, challenges can arise in areas where the stringers curve or deflect with the outer mold line of an aircraft. An example of such an area is an aircraft side of body (SOB) where the wing box and the center box of an aircraft are coupled. The dihedral and sweep angle of the wings may produce a curved region in which out-of-plane kick loads create rolling moments that the stringer is not capable of withstanding. In these situations, the CFRP stringers may fail due to interlamina tension stress at the radius between the stringer web and the base flange and/or the base flange may separate from the stringer noodle that is bonded between the stringer web and the base flange. It is also possible that the stringer may delaminate from skin due to increased shear loads in the bondline.

As a result, curved continuous CFRP stringers have not traditionally been used in highly loaded areas of an aircraft. In these highly loaded areas, conventional solutions have been to terminate the wing box stringers and center box stringers at opposite sides of a metal SOB chord to form a spliced joint. External reinforcement is typically provided at the joint with a metal SOB skin splice plate that further secures the skin to the SOB chord. While this solution may prevent delamination or other failure of the stringers due to excessive loads and corresponding rolling moments, the metal SOB chord and skin splice plate is undesirably heavy and complex.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods provide for utilizing continuous composite stringers to control the loads and corresponding moments within curved regions of an aircraft or other vehicle without delamination or other interlamina failure. According to one aspect of the disclosure provided herein, a continuous structural panel may include a continuous skin component and a bonded, co-cured and/or bolted continuous composite stringer. The continuous composite stringer may have a base flange coupled to the skin component and a web that projects outwardly from the base flange to a web height. The web may taper at a curved region of the continuous composite stringer.

According to another aspect, a method for utilizing a curved composite structural panel in an area subject to high loads includes forming a number of continuous composite stringers and a continuous skin component. The stringers and skin component may be coupled together. A reinforcement fitting may be coupled to a base flange of within a curved region of the panel to provide stability and out-of-plane load transfer. Each of the continuous composite stringers may be formed to include at least one straight region and curved region, a base flange, and a web. The web may have a straight web height within each straight region and a curved web height within each curved region that is less than the straight web height.

According to yet another aspect, a continuous structural panel may include a continuous skin component and a number of continuous composite stringers. The stringers each have first and second straight regions with an intervening curved region. The stringers may have a base flange that is coupled to the skin component. The base flange may include a straight base width in the straight regions and a curved base width in the curved region that is greater than the straight base width. The stringers may each further include a web projecting outwardly from the base flange to create a straight web height in the straight regions and a curved web height in the curved region that is less than the straight web height The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
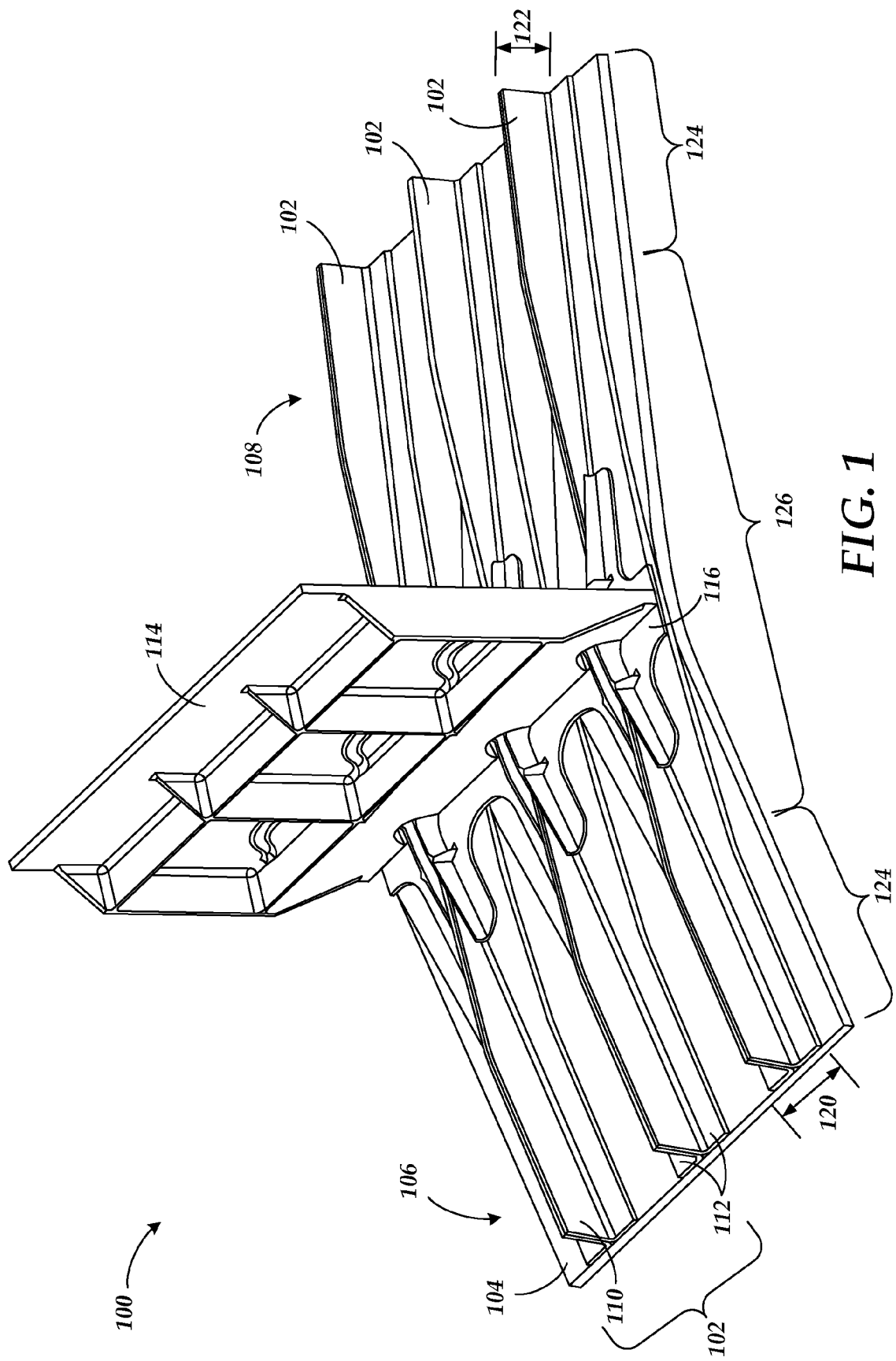
FIG. 1 is a front perspective view of a curved continuous stringer and skin panel showing various components coupled to three tapered height curved composite stringers according to various embodiments presented herein.

The following detailed description is directed to apparatus, systems, and methods for utilizing continuous composite stringers that control the loads and corresponding moments within curved regions of an aircraft or other vehicle without delamination or other interlamina failure. While the various embodiments will be described below in the context of an aircraft, with specific examples relating to side-of-body (SOB) areas of an aircraft, it should be appreciated that the disclosure provided herein is applicable to any vehicle or structure that would benefit from utilizing continuous curved composite stringers.

As discussed briefly above, conventional CFRP and other curved composite stringers are typically unable to withstand the high loads and corresponding moments experienced in some SOB and other non-planar areas of an aircraft without experiencing delamination issues or other material failure. A conventional stringer includes a vertical web and a horizontal base flange that may be coupled to the aircraft skin. Conventionally, the web and base flange are configured with substantially uniform dimensions. In other words, the height or vertical distance that a conventional stringer web extends away from the base flange may not change along the length of the stringer. Similarly, the width or horizontal distance that a conventional stringer base flange extends in either direction from the stringer web may remain constant along the length of the stringer. When conventional composite stringers are curved rather than straight, the curvature creates out-of-plane kick loads perpendicular to the in-plane loading direction. When the radius of curvature is relatively small, stringer rolling moments that result from the kick loads may exceed the capability of the composite stringer to withstand the moments.

In these situations, the conventional composite stringers may fail due to interlaminar tension stress at the radius between the stringer web and the base flange. Moreover, the base flange may separate from the stringer noodle that is bonded between the stringer web and base flange. It is also possible that the stringer may delaminate from skin due to increased shear loads in the bondline. As a result, conventional stringers are commonly terminated at a splice joint utilizing an internal supporting chord component and an external splice plate that are capable of withstanding the high loads. However, the internal supporting chord component and the external splice plate are substantial supports typically manufactured from titanium or another metal. These metallic components undesirably increase the weight and cost of the aircraft.

Utilizing the concepts and technologies described herein, a continuous curved stringer may be configured such that the web tapers in height in curved high-load areas. As the height of the web tapers to a significantly reduced height, the base flange may widen to an increased width. According to various embodiments, the ratio of web height reduction to base flange widening may be proportional such that the cross-sectional area of the stringer remains approximately the same along the length of the stringer. With the use of reinforcement fittings coupled to the continuous stringer in highly contoured areas of the resulting stringer and skin panel, the loads may be adequately controlled while allowing for continuous composite stringers that reduce the overall weight, number of parts, and overall cost as compared to traditional metallic spliced joints.

Figure 2:
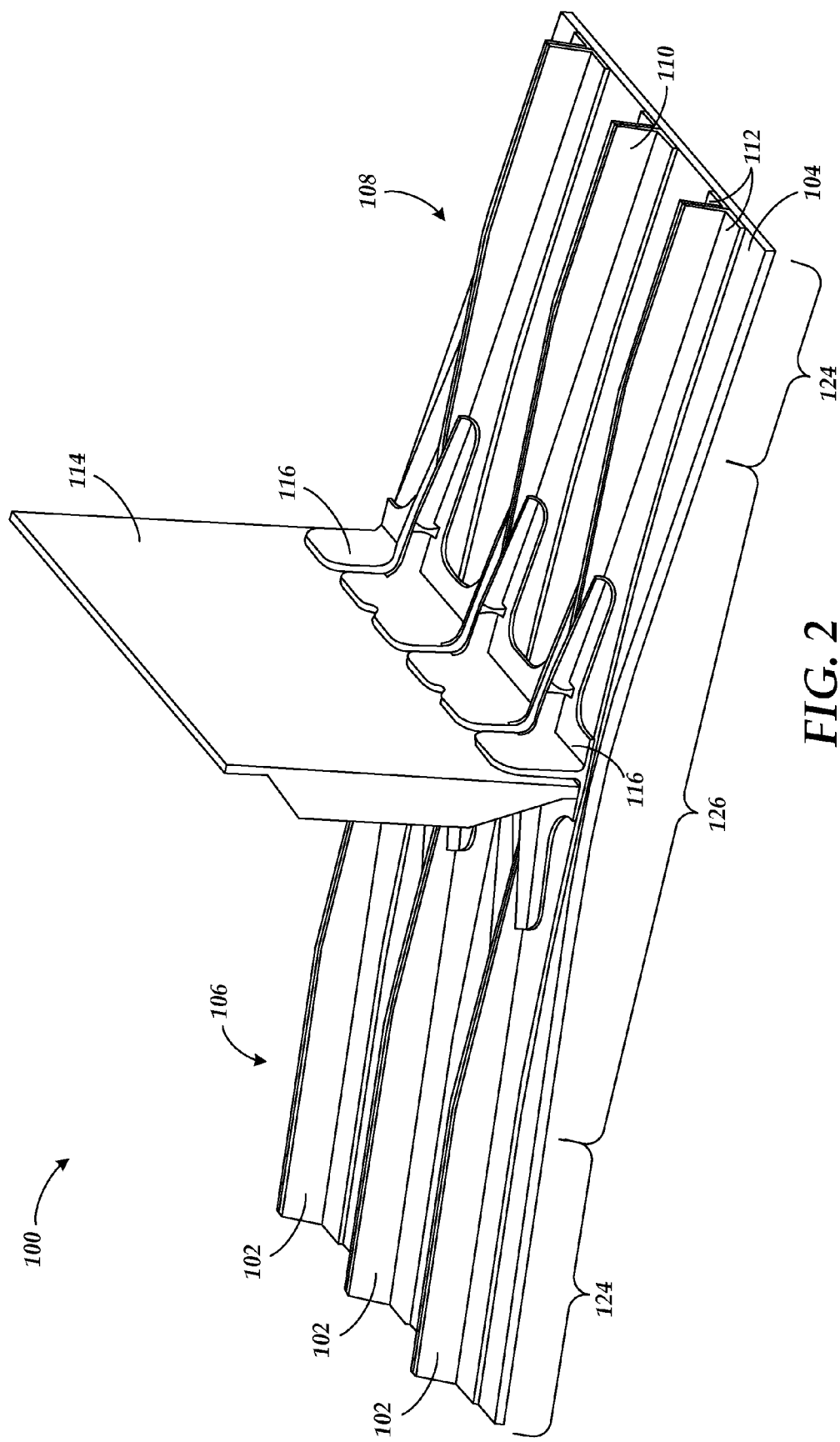
FIG. 2 is a rear perspective view of the curved continuous stringer and skin panel of FIG. 1 according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, the tapered composite stringers and corresponding components will be described. Turning to FIGS. 1 and 2, front and rear perspective views, respectively, of a curved continuous stringer and skin panel 100 are shown. According to this example, the panel 100 includes three tapered height curved composite stringers 102, although any number of stringers may be used. The tapered height curved composite stringers 102 are secured to a skin component 104 by either bonded, co-cured or bolted. The skin component 104 in this example includes wing box skin 106 and center box skin 108.

It should be appreciated that the skin component 104 may be any continuous skin portions covering any curved or contoured region of an aircraft or other vehicle and is not limited to the junction between the wing box skin 106 and center box skin 108. As used herein, the term "continuous" may apply to composite or other materials that do not terminate at a common fitting, but rather continue as a single component segment through an area of interest. "Continuous" may apply to composite and other materials that are formed through known processes for splicing together composite or other materials to form a single continuous segment.

Figure 5:
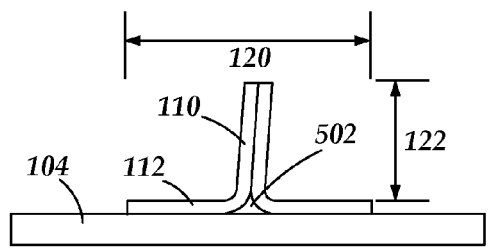
FIGS. 5-11 are cross-sectional views of the curved continuous stringer and skin panel of FIG. 4 taken at consecutive reference locations along the stringer according to various embodiments presented herein.

Each tapered height curved composite stringer 102 includes a web 110 and a base flange 112. Turning briefly to the cross-sectional view shown in FIG. 5, the components of a tapered height curved composite stringer 102 are more clearly seen. As shown in FIG. 5, the tapered height curved composite stringer 102 may be formed by creating two angled, or "L" shaped, composite sheets and bonding them together in a manner in which the web 110 extends substantially vertically away from the base flange 112. However, it should be understood that any method of forming the tapered height curved composite stringer 102 may be used without departing from the scope of this disclosure. The web 110 has a web height 122, while the base flange 112 has a base width 120. These dimensions will be discussed in detail below. A composite component, or noodle 502, may be laminated to the tapered height curved composite stringer 102 to fill a void created between the web 110 and base flange 112. The noodle 502 may be an area in which delamination may occur with traditional composite stringers in curved regions if the concepts described herein are not utilized.

Returning to FIGS. 1 and 2, the panel 100 of this illustrative embodiment may include an attached rib 114. The rib 114 may be any type of panel to be attached to the curved continuous stringer and skin panel 100 and is not limited to the illustrated configuration. According to this example, the rib 114 is attached to the panel 100 at a curved region 126 of the panel via a fitting 116. This curved region 126 is where the panel 100 experiences a curvature or contour, which could conventionally cause the stringers to fail or delaminate due to excessive web loading unless the stringers from the wing box skin 106 and center box skin 108 terminated at a chord and splice plate.

However, according to the embodiments described herein, the webs 110 of the tapered height curved composite stringers 102 decrease in web height 122 as the stringers transition from a straight region 124 to the curved region 126. A straight region 124 may be construed as any longitudinal portion of the tapered height curved composite stringer 102 in which the web 110 creates a flat planar surface. Similarly, a curved region 126 may be construed as any longitudinal portion of the tapered height curved composite stringer 102 in which the web 110 creates a curved, or non-planar surface. According to the example shown in FIGS. 1 and 2, the tapered height curved composite stringers 102 transition from a straight region 124 to a curved region 126 and back to a straight region 124.

By tapering the height of the webs 110, the kick loads and rolling moments associated with the web 110 are reduced. According to various embodiments, the web height 122 tapers substantially linearly (or non-linearly) from a height associated with the web 110 in the straight region 124 of the panel (referred to as the "straight web height") to a minimal web height 122 associated with the web 110 in the curved region 126 (referred to as the "curved web height"). As this tapering occurs, the base flange may widen substantially linearly (or non-linearly) from a base width 120 in the straight region 124 (referred to as the "straight base width") to a maximum base width 120 in the curved region 126 (referred to as the "curved base width"). Conversely, as the web height 122 increases from the curved web height in the curved region 126 of the panel 100 back to the straight web height in the straight region 124, the curved base width decreases back to the straight base width in the straight region 124. As will be discussed in greater detail below with respect to FIGS. 4-11, the relationship between the web height 122 and the base width 120 may be proportional, so that the cross-sectional area of the tapered height curved composite stringer 102 remains approximately constant throughout the various segments of the panel 100. In doing so, the base flange 112 at the curved base width carries a portion of the loads previously carried by the web 110 at the straight web height, but without having inducing a significant rolling moment since the curved web height is minimal.

When tapering the web 110 down to the curved web height, some bending moment of inertia is lost. In an effort to rebuild the bending moment of inertia and to transfer out-of-plane kick loads to other structures such as the rib 114, a reinforcement fitting 116 may be used. The fitting may be formed from metallic or non-metallic materials, including but not limited to aluminum, titanium, and CFRP. Because the axial load carried by the tapered height curved composite stringer web 110 is substantially decreased in the curved region 126 due to the decreased web height 122, the kick loads and moment in the web are substantially less. As a result, no structural reinforcement to the stringer web is necessary making the assembly of the fitting 116 to skin and stringer substantially simpler than the conventional chord and splice plates. The reinforcement fittings 116 may be coupled to the base flanges 112 of the tapered height curved composite stringer 102 in the curved region 126 using known techniques to provide additional structural support as described above, and to couple additional components to the panel 100, such as the rib 114.

Figure 3:
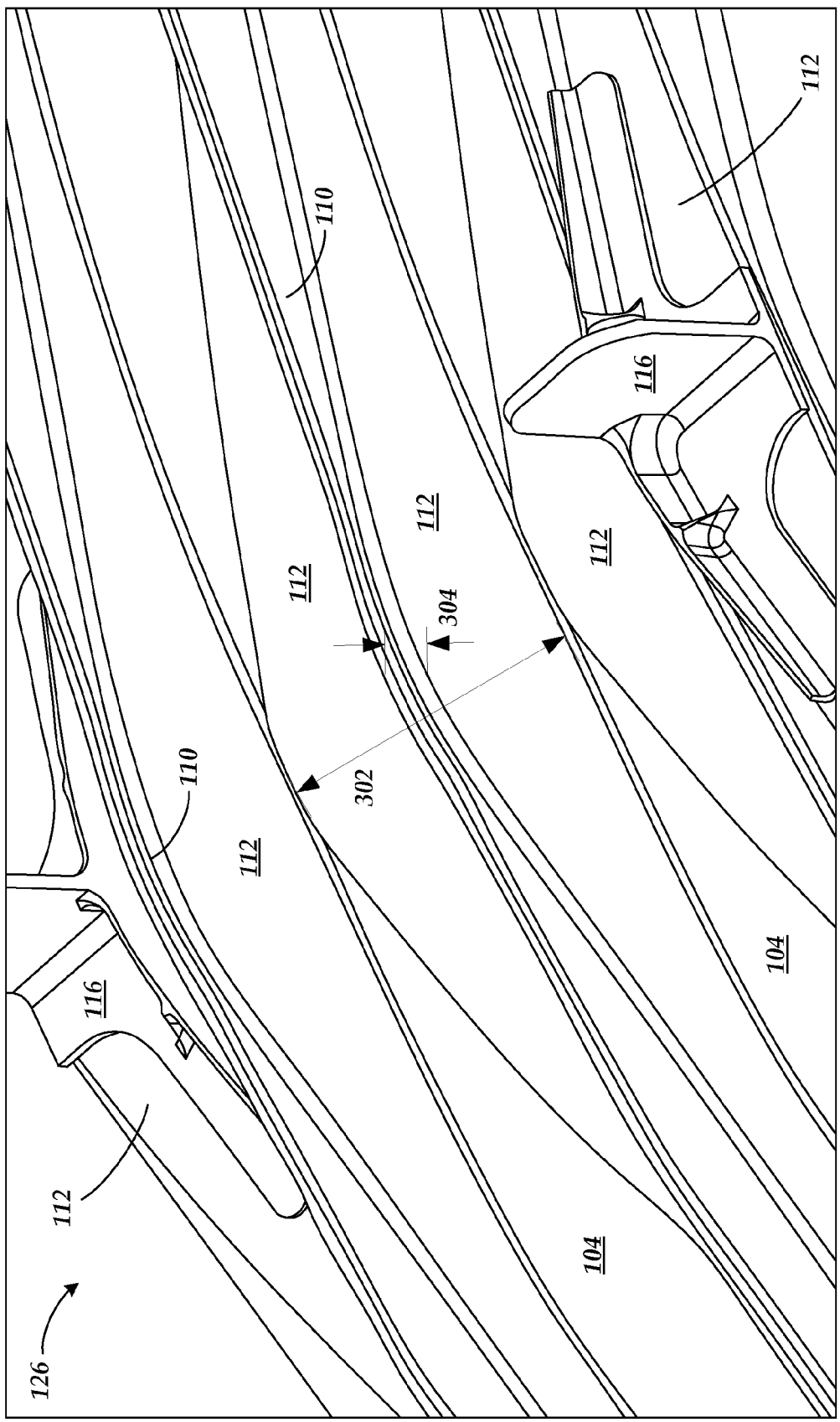
FIG. 3 is an enlarged view of the curved continuous stringer and skin panel of FIG. 1 without the rib and portions of a fitting to more clearly show aspects of the tapered height curved composite stringers according to various embodiments presented herein.

Turning now to FIG. 3, an enlarged view of the curved region 126 is shown. In this drawing, the reinforcement fitting 116 has been largely removed to more clearly illustrate the configuration of the web 110 and base flange 112. As seen in this example, the base flange widens to the curved base width 302 proximate to the longitudinal position of the tapered height curved composite stringer 102 corresponding to the position in which the web 110 tapers to the curved web height 304. This position may be at the center of the curved region 126, such as at the SOB joint between the wing box and the center box. According to various embodiments, the tapering of the web 110 and widening of the base flange 112 may be proportional, or may be disproportional with respect to one another. The tapering and widening may begin at a longitudinal position of the tapered height curved composite stringer 102 that precedes the start location for the curvature of the stringer.

The tapering of the web 110 reduces kick loads and corresponding moments in the web 110. These loads and moments are reduced to a quantity that prevents interlamina tension failure in the web 110 to base flange 112 area of the stringer. The widening of the base flange 112 increases the skin component 104 to base flange 112 bonded area, which reduces the intensity of the load transfer between the skin component 104 and base flange 112. Without this widening, the base flange 112 may debond, or delaminate, from the skin component 104 due to an increased bondline load transfer. It should be understood that according to various embodiments, the tapering and widening of the web 110 and base flange 112, respectively, may or may not be proportional and may or may not be linear.

Figure 4:
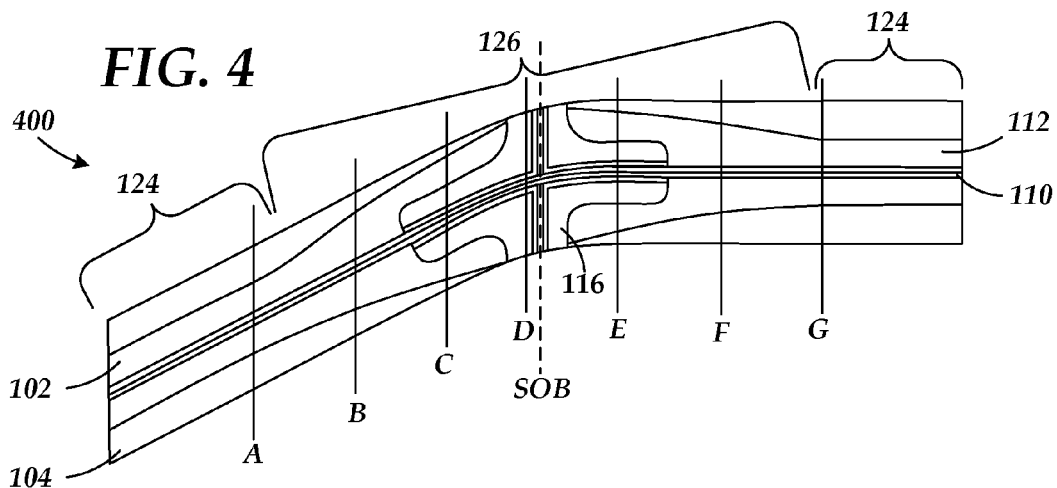
FIG. 4 is a top view of a curved continuous stringer and skin panel according to various embodiments presented herein.

FIG. 4 shows a top view of an example continuous curved composite panel 400 that includes a skin component 104 coupled to a tapered height curved composite stringer 102. The panel 102 includes a straight region 124 that transitions to a curved region 126 and back to a straight region 124. At the center of the curved region 126, such as at a SOB joint, a reinforcement fitting 116 is coupled to the base flange 112. To more clearly illustrate the configuration of the tapered height curved composite stringer 102 throughout the transition between straight and curved regions according to one embodiment, seven lines representing positions or stations A-G have been drawn across the panel 400 in FIG. 4. FIGS. 5-11 represent cross-sectional views of the panel 400 taken at each of these stations.

Figure 6:
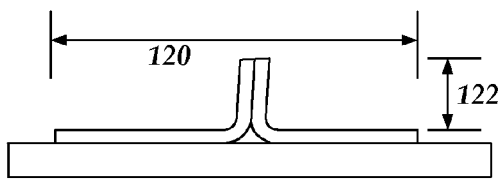

Looking at FIG. 5, station A represents a position within the first straight region 124 prior to the transition to the curved region 126. In the straight region 124, the tapered height curved composite stringer 102 includes a web 110 having a web height 122. The web height 122 may be at a maximum in the straight regions 124. Similarly, the base width 120 may be at a minimum within the straight regions 124. It should be noted that the web height 122 may be measured from the tip of the noodle 502, or from a top surface of the base flange 112, to the distal edge of the web 110. FIG. 6 shows a cross-sectional view of the tapered height curved composite stringer 102 taken at station B, which is a longitudinal position just within the curved region 126 in which the web 110 is beginning to taper while the base flange 112 widens. Although the drawings may not be accurately drawn to scale, it can be seen that embodiments provide for the aggregate cross-sectional area of the web 110 and base flange 112 remains substantially constant throughout the transition to and from the curved region 126 of the tapered height curved composite stringer 102.

Figure 7:
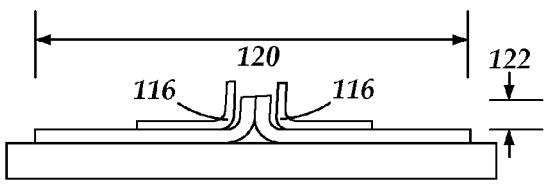

FIG. 7 shows a cross-sectional view of the tapered height curved composite stringer 102 taken at station C, which is a longitudinal position between station A in the straight region 124 and station D at or near the center of the curved region 126. As shown, the web height 122 continues to decrease as the base width 120 continues to widen in proportion to, or independent from, the tapering of the web 110. This cross-sectional view additionally shows the reinforcement fitting 116 according to one embodiment. The reinforcement fitting 116 may be secured to the top surface of the base flange 112, bridging over the web 110 without contacting the web 110. The gap between the web 110 and the reinforcement fitting 116 may be minimal and facilitates assembly of the fitting to the base flange 112. The height of the reinforcement fitting 116 may be determined according to the joint stability such that desired bending moment of inertia values are achieved.

Figure 8:
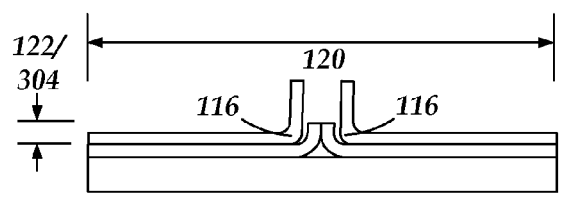
Figure 9:
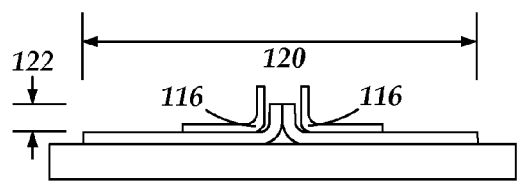
Figure 10:
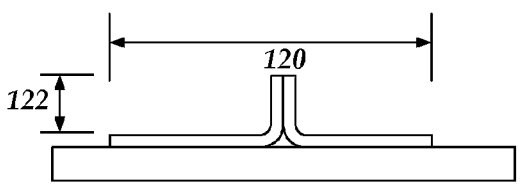
Figure 11:
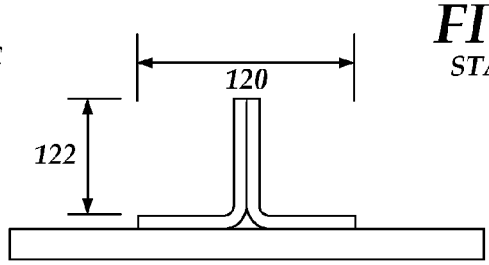

FIG. 8 shows a cross-sectional view of the tapered height curved composite stringer 102 taken at station D, which is a longitudinal position at or near the center of the curved region 126. At this position, the radius of curvature of the tapered height curved composite stringer 102 is at its minimum, which may impart substantially maximum loads to the web 110. Consequently, embodiments provide for the web 110 to be at a minimal height, which may be the curved web height 304 at the center of curvature in FIG. 3. According to one example implementation, the curved web height 304 may be 0.2 inches but the height could go down to zero. Also at this position, the base flange 112 is at its maximum, which may be the curved base width 302. FIGS. 9-11 show cross-sectional views of the tapered height curved composite stringer 102 taken at stations E-G, illustrating the subsequent lengthening of the web and narrowing of the base flange 112 to a web height 122 and base width 120, respectively, that substantially corresponds to the web height 122 and base width 120 at station A associated with the first straight region 124.

Figure 12:
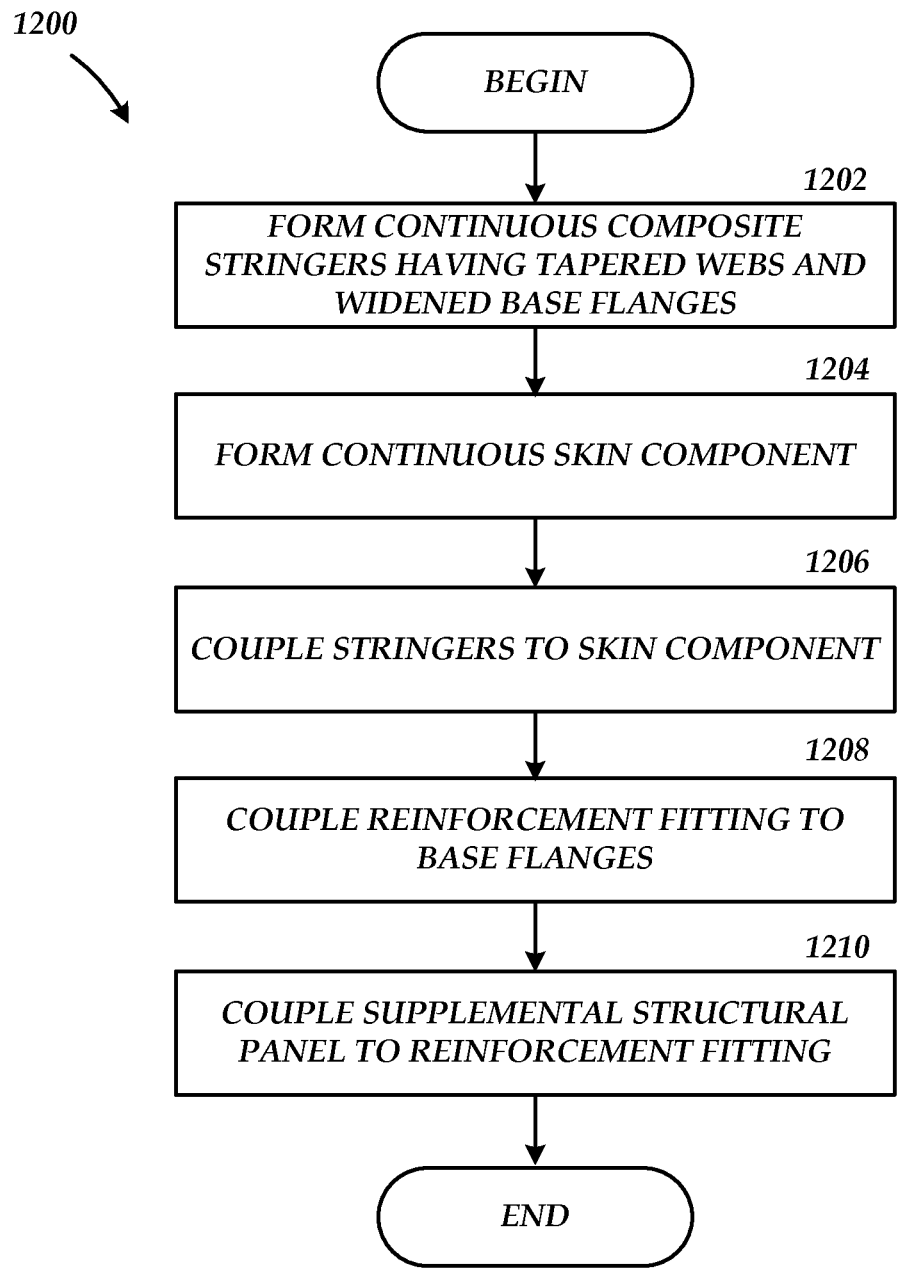
FIG. 12 is a process flow diagram illustrating a method for forming a curved continuous stringer and skin panel according to various embodiments presented herein.

Turning now to FIG. 12, an illustrative routine 1200 for utilizing a curved composite structural panel in a high-load area of an aircraft or other vehicle or structure will now be described in detail. It should be appreciated that more or fewer operations may be performed than shown in the figures and described herein. These operations may also be performed in a different order than those described herein.

The routine 1200 begins at operation 1202, where the tapered height curved composite stringers 102 are formed. The composite plies may be formed using known methods and materials. However, in forming the tapered height curved composite stringers 102, the web 110 should be trimmed according to the concepts described above within the appropriate curved regions 126. Tapering the webs 110 from the straight web height to the desired curved web height 304 and back may include trimming the webs 110 appropriately during or after the composite cures.

From operation 1202, the routine 1200 continues to operation 1204, where the continuous skin component 104 is formed. The continuous skin component 104 may be created utilizing any known materials and processes. The routine 1200 continues to operation 1206, where the tapered height curved composite stringers 102 are coupled to the continuous skin component 104 at desired locations according to known techniques to form a curved continuous stringer and skin panel 100. The panel 100 will have at least one curved region 126 with the tapered height curved composite stringers 102 transitioning from having a straight web height and base width at a first straight region 124, to a curved web height 304 and a curved base width 302 at a curved region 126, and back to the straight web height and base width at a second straight region 124.

From operation 1206, the routine 1200 continues to operation 1208, where one or more reinforcement fittings 116 are coupled to the base flanges 112 of the tapered height curved composite stringers 102 at appropriate locations within one or more curved regions 126. A supplemental structural panel, such as a rib 114, may be attached to the curved continuous stringer and skin panel 100 via the reinforcement fittings 116 at operation 1210, and the routine 1200 ends.

Based on the foregoing, it should be appreciated that technologies for controlling various loads and resulting moments within curved and contoured composite panels have been presented herein. Utilizing the concepts disclosed herein, curved continuous stringers and skin components may be reliably used in place of heavy conventional metallic fittings that increase weight, part counts, and cost of an aircraft or other platform with which the curved continuous composite panels are implemented.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A continuous structural panel, comprising:
   a continuous skin component; and
   a continuous curved composite stringer having
      a base flange coupled to the continuous skin component, and
      a web projecting outward from the base flange to create a web height, wherein the web tapers at a curved region of the continuous composite stringer, and wherein the base flange extends away from the web to create a base width that increases as the web height decreases.

2. The continuous structural panel of claim 1, wherein the continuous curved composite stringer comprises a carbon fiber reinforced polymer (CFRP).

3. The continuous structural panel of claim 1, further comprising a reinforcement fitting coupled to the base flange at the curved region and configured to increase a bending moment of inertia of the continuous curved composite stringer at the curved region.

4. The continuous structural panel of claim 3, further comprising a supplemental structural panel attached to the continuous structural panel via the reinforcement fitting, wherein the reinforcement fitting transfers loads from the continuous curved composite stringer and the continuous skin component to the supplemental structural panel.

5. The continuous structural panel of claim 1, wherein the continuous skin component and the continuous curved composite stringer span an aircraft side of body (SOB) joint.

6. A method for utilizing a curved composite structural panel in a high-load area of a vehicle, the method comprising:
   forming a plurality of continuous curved composite stringers, each continuous curved composite stringer having
      at least one straight region, at least
      one curved region,
      a base flange, and
      a web, the web having
         a straight web height in each straight region, and
         a curved web height in each curved region that is less than the straight web height;
   forming a continuous skin component;
   coupling the plurality of continuous curved composite stringers to the continuous skin component; and
   coupling a reinforcement fitting to at least one base flange at the at least one curved region to provide stability to the curved composite structural panel in the at least one curved region.

7. The method of claim 6, wherein forming each continuous curved composite stringer comprises forming each continuous curved composite stringer such that the base flange extends away from the web to create a straight base width in each straight region and a curved base width in each curved region, and wherein the curved base width in each curved region is greater than the straight base width in each straight region.

8. The method of claim 6, further comprising coupling a supplemental structural panel to the curved composite structural panel via the reinforcement fitting.

9. The method of claim 8, wherein the supplemental structural panel comprises an aircraft rib, and wherein the continuous curved composite stringer corresponds to a wing box stringer and a center box stringer such that the curved composite structural panel is located at a location corresponding to a wing to body joint.

10. The method of claim 6, wherein the web of the continuous curved composite stringer tapers substantially linearly from the straight web height to the curved web height and back to the straight web height.

11. The method of claim 6, wherein the web of the continuous curved composite stringer tapers substantially nonlinearly from the straight web height to the curved web height and back to the straight web height.

12. A continuous structural panel, comprising:
    a continuous skin component; and
    a plurality of continuous curved composite stringers, each continuous curved composite stringer having
       a first straight region,
       a second straight region, a curved region between the first straight region and the second straight region, a base flange coupled to the continuous skin component and having a straight base width at the first straight region and the second straight region, and a curved base width greater than the straight base width at the curved region, and a web projecting outward from the base flange to create a straight web height in the first straight region and the second straight region, and a curved web height in the curved region that is less than the straight web height.

13. The continuous structural panel of claim 12, wherein the web of each continuous curved composite stringer tapers substantially linearly between the straight web height and curved web height, and wherein the base width of each continuous curved composite stringer increases as the web height decrease.

14. The continuous structural panel of claim 13, wherein a cross-sectional area of each continuous curved composite stringer is substantially unchanging throughout a longitudinal length of the continuous curved composite stringer.

15. The continuous structural panel of claim 12, further comprising a reinforcement fitting coupled to at least one base flange at the curved region and configured to transfer out-of-plane kick loads to an attached structure.

16. The continuous structural panel of claim 15, further comprising a supplemental structural panel coupled to the continuous structural panel via the reinforcement fitting.

17. A continuous structural panel, comprising:
a continuous skin component; and
a continuous curved composite stringer having
a base flange coupled to the continuous skin component, and
a web projecting outward from the base flange to create a web height,
wherein the web height comprises a straight web height at first location in which the web defines a planar surface,
wherein the web height tapers from the straight web height at the first location to a curved web height at a second location associated with a curved region of the continuous composite stringer in which the web curves to define a non-planar surface, and
wherein the web height increases from the curved web height at the second location back to the straight web height at a third location in which the web defines a planar surface.

18. The continuous structural panel of claim 17, wherein the base flange extends away from the web to create a base width, and wherein the base width increases from the first location to the second location and decreases from the second location to the third location.

19. The continuous structural panel of claim 17, wherein the second location corresponds to an approximate position along a length of the continuous curved composite stringer associated with a minimum radius of curvature of the continuous curved composite stringer.

\* \* \* \* \*